United States Patent
Mottram

(10) Patent No.: US 11,313,236 B2
(45) Date of Patent: Apr. 26, 2022

(54) COOLANT CHANNEL

(71) Applicant: ROLLS-ROYCE plc, London (GB)

(72) Inventor: Martin Mottram, Bristol (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 16/382,312

(22) Filed: Apr. 12, 2019

(65) Prior Publication Data

US 2019/0330989 A1 Oct. 31, 2019

(30) Foreign Application Priority Data

Apr. 26, 2018 (GB) ...................................... 1806821

(51) Int. Cl.
*F01D 5/18* (2006.01)

(52) U.S. Cl.
CPC ............ *F01D 5/186* (2013.01); *F01D 5/187* (2013.01); *F05D 2240/124* (2013.01); *F05D 2240/306* (2013.01); *F05D 2260/20* (2013.01); *F05D 2260/22141* (2013.01)

(58) Field of Classification Search
CPC .......... F01D 5/186; F01D 5/187; F01D 25/12; F05D 2260/20; F05D 2260/202; F05D 2260/2212; F05D 2260/2214; F05D 2260/22141; F05D 2240/124; F05D 2240/306; F05D 2270/3015; Y02T 50/60
See application file for complete search history.

(56) References Cited

U.S. PATENT DOCUMENTS

| 3,628,885 | A | * | 12/1971 | Sidenstick | F01D 5/189 416/217 |
| 4,105,364 | A | * | 8/1978 | Dodd | F01D 5/189 416/97 R |
| 4,180,373 | A | * | 12/1979 | Moore | F01D 5/187 415/115 |
| 4,695,247 | A | * | 9/1987 | Enzaki | F23R 3/06 431/352 |

(Continued)

FOREIGN PATENT DOCUMENTS

| EP | 1790819 | 5/2007 |
| EP | 2149676 | 2/2010 |

(Continued)

OTHER PUBLICATIONS

Fujimura et al. JP 2006214324 English Machine Translation, translated by ProQuest May 22, 2021 (Year: 2006).*

(Continued)

*Primary Examiner* — David E Sosnowski
*Assistant Examiner* — Wayne A Lambert
(74) *Attorney, Agent, or Firm* — Barnes & Thornburg LLP

(57) ABSTRACT

A component for a gas turbine engine, comprising: a first wall defining an exterior surface of the component; a second wall, arranged such that a coolant channel is defined by the space between the first and second walls; and a plurality of apertures provided through the first wall to connect the coolant channel to the exterior surface of the component; wherein adjacent at least one aperture the coolant channel comprises a flow modifier, configured to locally change the pressure of the coolant flowing in the coolant channel in the region of the aperture relative to a region of the coolant channel adjacent another aperture.

17 Claims, 4 Drawing Sheets

(56) References Cited

U.S. PATENT DOCUMENTS

| | | | | |
|---|---|---|---|---|
| 5,328,331 | A * | 7/1994 | Bunker | F01D 5/187 415/115 |
| 5,356,265 | A * | 10/1994 | Kercher | F01D 5/187 416/97 R |
| 5,361,828 | A * | 11/1994 | Lee | F01D 5/187 165/109.1 |
| 5,533,864 | A * | 7/1996 | Nomoto | F01D 5/186 415/115 |
| 5,538,394 | A * | 7/1996 | Inomata | F28F 3/02 416/97 R |
| 5,779,438 | A * | 7/1998 | Wilfert | F01D 5/186 415/115 |
| 6,474,947 | B1 * | 11/2002 | Yuri | F01D 5/186 416/97 R |
| 6,582,194 | B1 * | 6/2003 | Birkner | B23P 15/04 415/115 |
| 6,890,153 | B2 * | 5/2005 | Demers | F01D 5/186 415/1 |
| 8,210,814 | B2 * | 7/2012 | Zausner | F01D 5/187 416/97 R |
| 8,757,974 | B2 * | 6/2014 | Propheter-Hinckley | F01D 5/188 416/97 R |
| 9,062,560 | B2 * | 6/2015 | Hayford | F01D 17/162 |
| 9,133,717 | B2 * | 9/2015 | Nakamata | F01D 5/189 |
| 9,732,617 | B2 * | 8/2017 | Wang | F01D 5/187 |
| 10,767,509 | B2 * | 9/2020 | Clum | F01D 9/041 |
| 2005/0053459 | A1 * | 3/2005 | Cunha | F01D 5/186 415/115 |
| 2010/0034638 | A1 * | 2/2010 | Chambers | F01D 5/187 415/115 |
| 2010/0074762 | A1 | 3/2010 | Liang | |
| 2014/0093379 | A1 * | 4/2014 | Tibbott | F01D 5/189 416/224 |
| 2015/0016947 | A1 * | 1/2015 | Kwon | F01D 25/12 415/1 |
| 2016/0138478 | A1 * | 5/2016 | Negulescu | F02C 7/18 415/122.1 |
| 2017/0167268 | A1 * | 6/2017 | Bunker | F01D 5/186 |

FOREIGN PATENT DOCUMENTS

| | | |
|---|---|---|
| EP | 2716868 | 4/2014 |
| EP | 3064712 | 9/2016 |
| EP | 3179041 | 6/2017 |
| EP | 3181815 | 6/2017 |
| EP | 3205824 | 8/2017 |
| JP | 2006214324 A * | 8/2006 |
| WO | 2015023338 | 2/2015 |

OTHER PUBLICATIONS

Great Britain search report dated Oct. 16, 2018, issued in GB Patent Application No. 1806821.3.

European search report dated Jul. 10, 2019, issued in GB Patent Application No. 19165064.

* cited by examiner

COOLANT CHANNEL

CROSS-REFERENCE TO RELATED APPLICATIONS

This specification is based upon and claims the benefit of priority from United Kingdom patent application Number GB 1806821.3 filed on Apr. 26, 2018, the entire contents of which are incorporated herein by reference.

BACKGROUND

Technical Field

The present disclosure relates to the provision of components within a gas turbine engine having an internally formed coolant channel. For example, it has been known to provide coolant channels between an inner wall and an outer wall on a suction side of an aerofoil blade or vane that is part of a turbine within such a gas turbine engine.

Description of the Related Art

It has previously been known for components including such coolant channels to have a series of apertures provided on the exterior surface of the components that are connected to the coolant channel. Coolant may then flow through the coolant channel and exit the component via the apertures. In some arrangements, the apertures may be configured such that the coolant flowing from the apertures forms a surface film of coolant on the exterior surface of the component. However, provision of the flows of coolant reduces the efficiency and therefore increases the specific fuel consumption of the engine.

It may therefore be desirable to configure the coolant channel to provide as much benefit as possible from the coolant provided to the coolant channel.

SUMMARY

According to a first aspect there is provided a component for a gas turbine engine, comprising a first wall defining an exterior surface of the component; a second wall, arranged such that a coolant channel is defined by the space between the first and second walls; and a plurality of apertures provided through the first wall to connect the coolant channel to the exterior surface of the component; wherein adjacent at least one aperture the coolant channel comprises a flow modifier, configured to locally change the pressure of the coolant flowing in the coolant channel in the region of the aperture relative to a region of the coolant channel adjacent another aperture.

In an arrangement, a first aperture is arranged downstream from a second aperture in a direction of flow of the coolant. A flow modifier may be provided within the coolant channel on the surface of the first wall, upstream of, and adjacent, the second aperture such that the pressure of coolant flowing in the coolant channel in the region of the second aperture is lower than the pressure of coolant flowing in the coolant channel in the region of the first aperture.

In an arrangement, said first aperture is one of a first row of apertures and said second aperture is one of a second row of apertures, the first row of apertures arranged downstream from the second row of apertures in the direction of flow of coolant. A flow modifier may be provided within the coolant channel on the surface of the first wall upstream of, and adjacent, each of the apertures in the second row of apertures.

In an arrangement, the first and second apertures open on the exterior surface of the component in first and section regions respectively and the component is configured such that in use the pressure on the external surface in the first region is higher than in the second region.

In an arrangement, the component is an aerofoil blade or vane, comprising an aerofoil leading edge, an aerofoil trailing edge and an aerofoil suction side; the first wall defines at least part of the exterior surface of the suction side of the component; and the first aperture and/or first row of apertures is closer to the aerofoil leading edge than the second aperture and/or second row of apertures, respectively.

In an arrangement the component is configured such that, in the region of the first and second apertures, the direction of flow of coolant is in a direction from the aerofoil trailing edge to the aerofoil leading edge.

In an arrangement, a third aperture is arranged downstream from a fourth aperture in a direction of flow of the coolant; and a flow modifier is provided within the coolant channel, downstream of, and adjacent, the fourth aperture such that the pressure of coolant flowing in the coolant channel in the region of the fourth aperture is higher than the pressure of the coolant in the coolant flowing channel in the region of the third aperture.

In an arrangement, said third aperture is one of a third row of apertures and said fourth aperture is one of a fourth row of apertures, the third row of apertures arranged downstream from the fourth row of apertures in the direction of flow of coolant, and a flow modifier is provided within the coolant channel downstream of, and adjacent, each of the apertures in the fourth row of apertures.

In an arrangement the third and fourth apertures open on the exterior surface of the component in third and fourth regions, respectively; and the component is configured such that in use the pressure on the external surface in the fourth region is higher than in the third region.

In an arrangement, the component is an aerofoil blade or vane, comprising an aerofoil leading edge, an aerofoil trailing edge, and an aerofoil suction side; the first wall defines at least part of the exterior surface of the suction side of the component; and the fourth aperture and/or fourth row of apertures is closer to the aerofoil leading edge than the third aperture and/or third row of apertures, respectively.

In an arrangement, the component is configured such that, in the region of the third and fourth apertures, the direction of flow of coolant is in a direction from the aerofoil leading edge to the aerofoil trailing edge.

In an arrangement, a fifth aperture is separated from a sixth aperture in a direction transverse to the direction of the flow of coolant; and a flow modifier is provided within the coolant channel such that the pressure of the coolant flowing in the coolant channel in the region of the fifth aperture is lower than the pressure of the coolant in the coolant channel in the region of the sixth aperture.

In an arrangement, a flow modifier is provided on the surface of the first wall upstream of, and adjacent, the fifth aperture.

In an arrangement, a flow modifier is provided downstream of, and adjacent, the sixth aperture.

In an arrangement said fifth aperture is one of a fifth row of apertures and said sixth aperture is one of a sixth row of apertures, the fifth row of apertures separated from the six row of apertures in a direction transverse to the direction of flow of the coolant; and a row of flow modifiers is provided within the coolant channel, each adjacent a respective aperture in the fifth row of apertures and/or the sixth row of apertures.

In an arrangement, the fifth and sixth apertures open on the exterior surface of the component in fifth and sixth regions, respectively; and the component is configured such that in use the pressure on the external surface in the sixth region is higher than in the fifth region.

In an arrangement, the component is an aerofoil blade or vane, comprising an aerofoil leading edge, an aerofoil trailing edge and an aerofoil suction side; the first wall defines at least part of the exterior surface of the suction side of the component; and the sixth aperture and/or sixth row of apertures is closer to the aerofoil leading edge than the fifth aperture and/or fifth row of apertures, respectively.

In an arrangement, the component is configured such that, in the region of the fifth and sixth apertures, the direction of flow of coolant is the radial direction of the aerofoil blade or vane.

In an arrangement, the flow modifier locally reduces the cross-sectional area of the coolant channel transverse to the local direction of flow of the coolant.

In an arrangement, flow modifier has a cross-section in a direction transverse to the local direction of flow of the coolant that is one of a square, a rectangle, a triangle and aerodynamically profiled.

In an arrangement there is provided a gas turbine engine for an aircraft comprising an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft; and at least one component as above.

In an arrangement of the gas turbine engine, the turbine may be a first turbine, the compressor may be a first compressor, and the core shaft may be a first core shaft. The engine core may further comprise a second turbine, a second compressor, and a second core shaft connecting the second turbine to the second compressor; and the second turbine, second compressor, and second core shaft may be arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
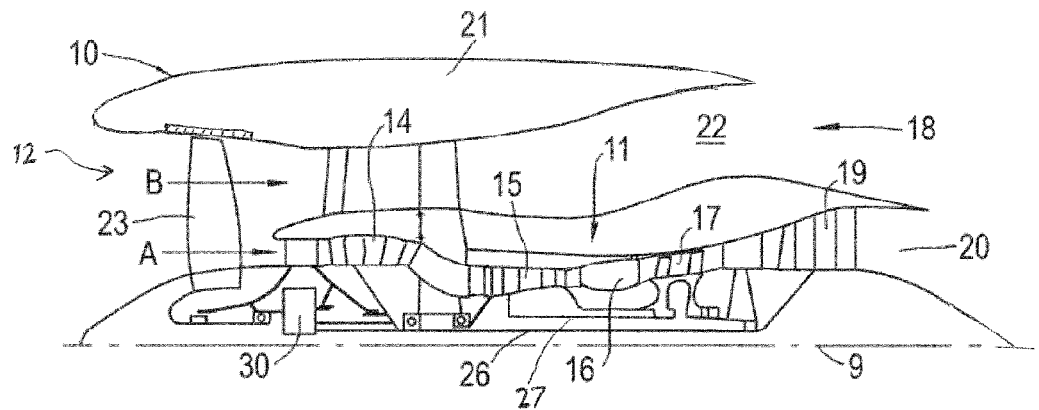
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
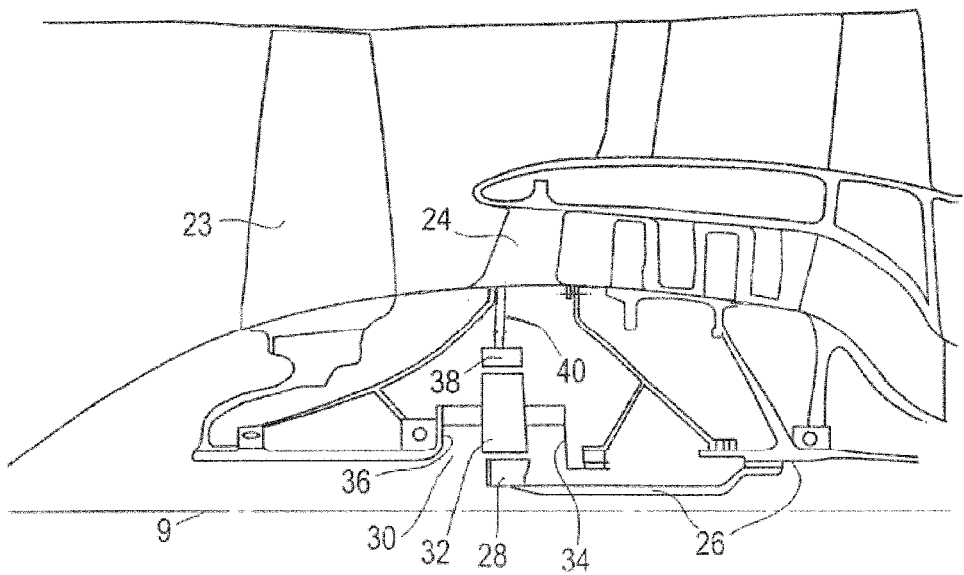
FIG. 2 is a close up sectional side view of an upstream portion of a gas turbine engine.

An exemplary arrangement for a geared fan gas turbine engine 10 is shown in FIG. 2. The low pressure turbine 19

(see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
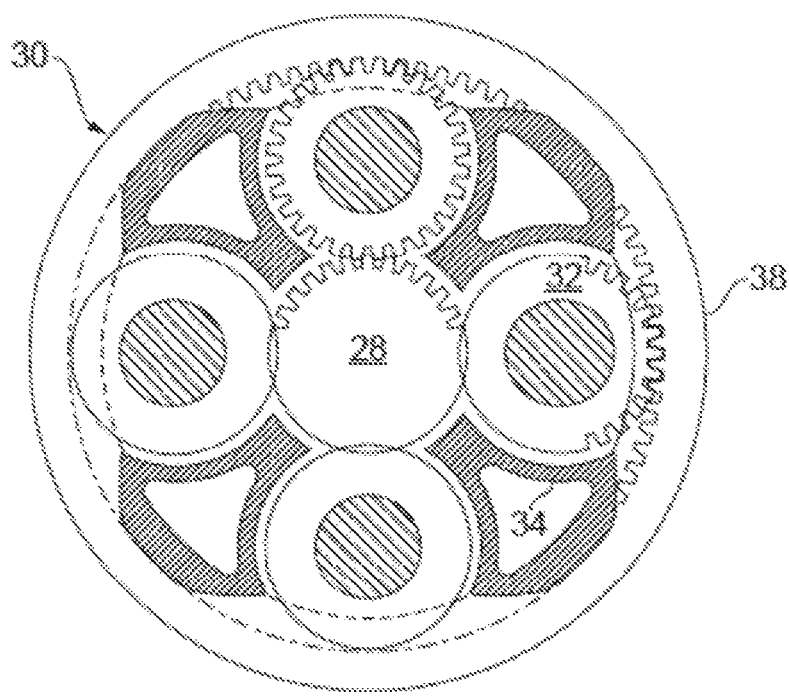
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
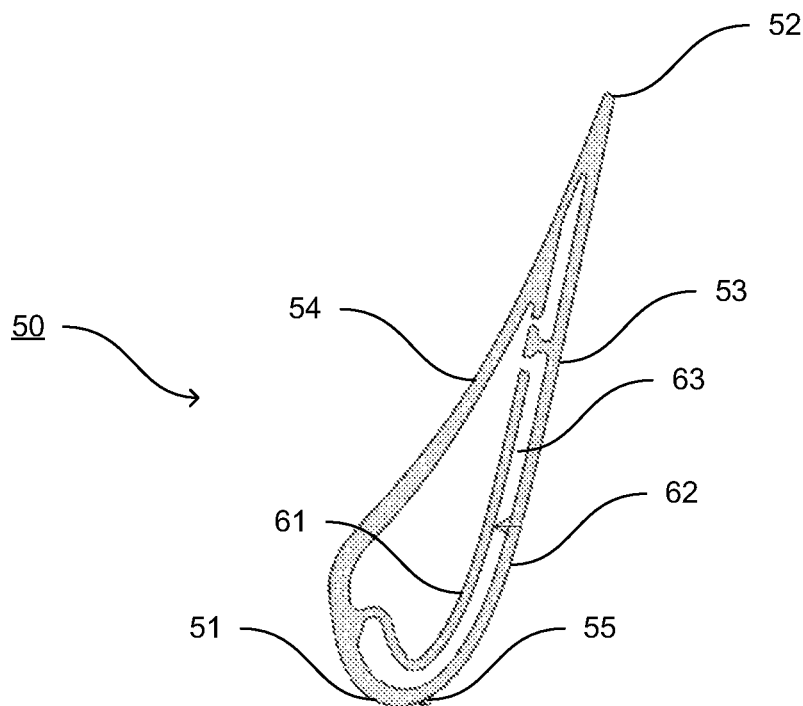
FIG. 4 schematically depicts, in cross-section, a component to which the present disclosure may apply.

FIG. 4 schematically depicts, in cross-section, a component to which the present disclosure may apply, in particular an aerofoil blade that may be incorporated within a turbine. Such an aerofoil component 50 has a leading edge 51, trailing edge 52, suction side 53 and pressure side 54 as generally indicated in FIG. 4.

As shown, the suction side 53 of the aerofoil 50 may be formed from an inner wall 61 and an outer wall 62 with a space 63 provided between the inner wall 61 and outer wall 62. The space 63 may be configured to receive a flow of coolant in order to cool the suction side 53 of the aerofoil 50. One or more apertures, not shown in FIG. 4, may connect the space 63 to the exterior surface of the aerofoil 50. In such an arrangement, coolant may be provided to the root of the aerofoil, flow through a supply channel in the aerofoil to the coolant channel, flow through the coolant channel provided by the space 63 and out through the apertures. In some cases, the apertures may be configured such that coolant flows over the surface of the aerofoil 50.

Within the aerofoil component 50, elongate ribs (not shown in FIG. 4) may be provided between the inner wall 61 and the outer wall 62. The ribs may mechanically attach the inner wall 61 and outer wall 62 together, improving the structural strength of the aerofoil component 50. Alternatively or additionally, the ribs may function to subdivide the space 63 between the inner wall 61 and the outer wall 62, namely the coolant channel, and/or guide the direction of the flow of coolant within the coolant channel.

The present disclosure provides arrangements of cooling channels for use in components such as an aerofoil 50 that may enable improvements in the use of the coolant. It should be appreciated that, although this disclosure is provided in the context of the formation of an aerofoil blade or vane, in general the arrangement is applicable to other components within a gas turbine engine in which a coolant channel is provided between first and second walls. Such other components may include the combustion liner, turbine rotor liner, or afterburner systems.

In order to make effective use of the coolant, it may be desirable to control the flow of coolant through the apertures that connect the coolant channel to the external surface. The rate of flow through each aperture depends on the difference between the local pressure external to the aperture and the local internal pressure within the coolant channel.

The external pressure may vary dependent on the location of the aperture. For example, in an aerofoil blade or vane 50, the external pressure on the suction side 53 may be greater towards the leading edge 51 than towards the trailing edge 52. Therefore, for a given pressure within the coolant channel, the flow of coolant through an aperture near the trailing edge 52 may be greater than the coolant flow through an aperture near the leading edge 51. This may be undesirable because, in order to provide sufficient coolant flow through the aperture nearest the leading edge 51, the pressure of coolant within the coolant channel 63 may need to be set to a level that results in higher than necessary coolant flow through the aperture nearest the trailing edge 52. Such a higher than necessary coolant flow may adversely affect the specific fuel consumption of the gas turbine engine.

Figure 5:
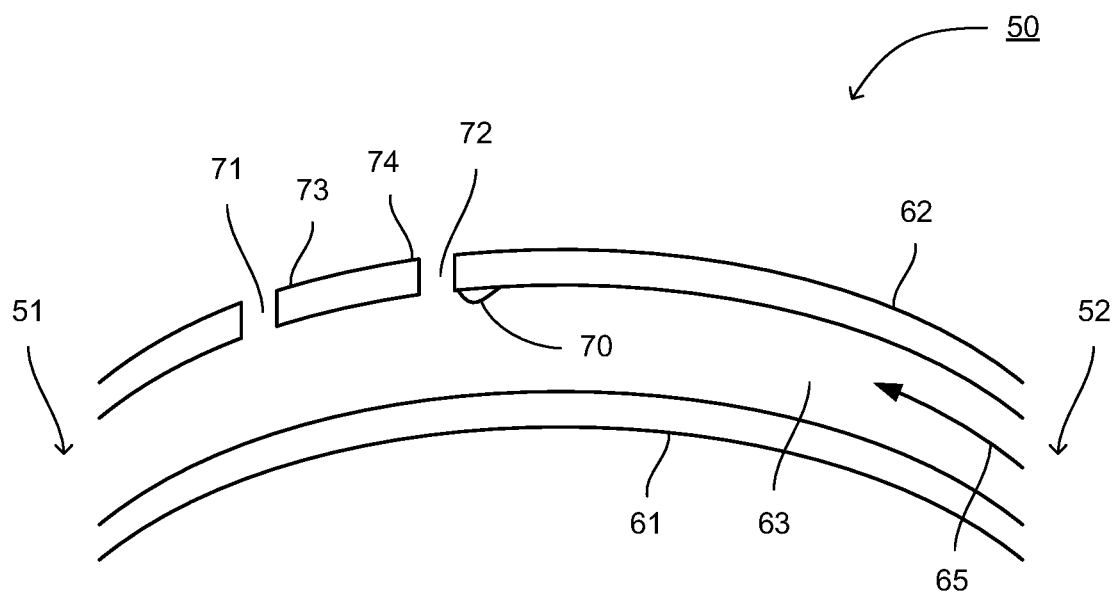
FIG. 5 schematically depicts, in cross-section, a coolant channel of a first arrangement of the present disclosure.

FIG. 5 schematically depicts in cross-section a coolant channel 63 between a first wall 62 providing the exterior surface of the suction side 53 of an aerofoil blade or vane and second, interior, wall 61. The arrangement shown is for a coolant channel 63 in a so-called reverse-pass cooling mode. In this case, as shown, the flow of coolant 65 through the coolant channel 63 is locally in a direction from the trailing edge 52 to the leading edge 51.

In the arrangement shown in FIG. 5, a first aperture 71 extends from the coolant channel 63 to the exterior surface of the suction side 53. A second aperture 72, provided upstream of the first aperture 71, also connects the coolant channel 63 to the external surface of the suction side 53. A flow modifier 70 is provided on the surface of the first wall 62, adjacent and upstream of the second aperture 72. The flow modifier 70 may be configured to cause a flow separation, resulting in a local region of reduced pressure of coolant at the first aperture 72. The coolant pressure adjacent the first aperture 71 may be largely unaffected by the presence of the flow modifier 70 adjacent to the second aperture 72. As a result, the coolant pressure within the coolant channel 63 may be higher adjacent the first aperture 71 than adjacent the second aperture 72.

In an arrangement, the flow modifier 70 may be configured to locally reduce the coolant pressure within the coolant channel 63 adjacent the second aperture 72 such that the difference in the coolant pressure within the coolant channel 63 adjacent the first and second apertures 71, 72 corresponds to the difference in external pressure adjacent the apertures 71, 72 during operation of the gas turbine engine. In such an arrangement, the flow of coolant through the first and second apertures 71, 72 may be matched. However, this need not be the case. More generally, the flow modifier 70 may be configured to adjust the coolant pressure within the coolant channel 63 adjacent to the apertures 71, 72 to provide any desired relative rate of flow of coolant through the apertures 71, 72, taking into account the different local external pressures in the respective regions 73, 74 of the external surface adjacent the apertures 71, 72 during operation of the gas turbine engine.

In an arrangement, additional apertures may be provided further upstream of the second coolant channel 72. One or more of the additional apertures may be provided with a corresponding flow modifier, configured for its particular location, such that the local pressures within the coolant channel 63 adjacent each of the apertures can be independently set in order to provide desired flows of coolant through each of the apertures.

In an arrangement, plural rows of apertures may be provided, for example that extend radially along an aerofoil blade or vane, for example in a direction from the aerofoil root to the aerofoil tip. In an arrangement such as that depicted in FIG. 5, a first row of apertures 71 may be provided downstream from a second row of apertures 72. A flow modifier 70 may be provided upstream of, and adjacent, each of the second apertures 72 on the first wall 62. A separate flow modifier 70 may be provided for each aperture 72 in the second row of apertures 72. Alternatively, a common flow modifier 70 may be provided for two or more apertures 72 in the second row of apertures 72.

Although the arrangement depicted in FIG. 5 and discussed above is disclosed in the context of an arrangement in which the first and second apertures 71, 72 open into respective regions 73, 74 of the external surface of the component in which the external pressure in the region 73 adjacent the first aperture 71 is greater than the external pressure in the region 74 adjacent the second aperture 72, this need not be the case. Accordingly for example, the arrangement of a flow modifier 70 as shown in FIG. 5 may be used to increase the difference in pressure drop across one aperture compared to another, and therefore increase the difference in the rate of flow of coolant through the apertures.

Similarly, the arrangement depicted in FIG. 5 and discussed above need not only be used in arrangements in which the local flow of coolant 65 is in a direction from the trailing edge 52 towards the leading edge 51 of an aerofoil blade or vane 50.

In alternative arrangements discussed below and depicted in FIGS. 6 and 7, different arrangements may be provided to modify the flow of coolant from the coolant channel 63 through respective apertures. For clarity, the arrangements described below refer to the third and fourth apertures and fifth and sixth apertures, respectively.

However, it should be appreciated that a component only having one of the arrangement discussed below may only have third and fourth apertures or fifth and sixth apertures, namely may not have first and second apertures as discussed above in relation to FIG. 5. Alternatively, a component according to the present disclosure may have plural coolant channels 63, or sections of the coolant channel 63, each having any one of the three types of arrangement disclosed. It should also be appreciated that the variations of the arrangement shown in FIG. 5 may also apply to the arrangements shown in FIGS. 6 and 7.

Figure 6:
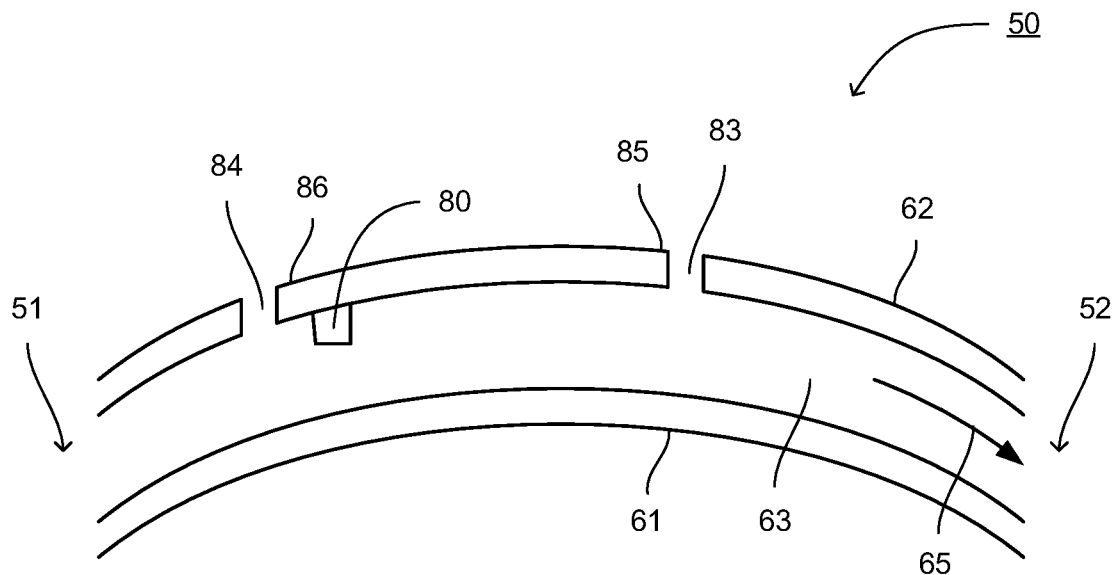
FIG. 6 schematically depicts, in cross-section, a coolant channel of a second arrangement of the present disclosure.

FIG. 6 schematically depicts in cross-section an arrangement in which the flow of coolant 65 is locally from the leading edge 51 to the trailing edge 52 of an aerofoil blade or vane 50. Third and fourth apertures 83, 84 are provided through the first wall 62 from the coolant channel 63 to the suction side exterior surface 53.

As shown, the third aperture 83 is arranged downstream from the fourth aperture 84 in the direction of flow of coolant 65.

In this arrangement, a flow modifier 80 is provided adjacent, but downstream of, the fourth aperture 84. In such an arrangement, the local pressure inside the coolant channel 63 adjacent the fourth aperture is increased relative to the local pressure in the coolant channel 63 adjacent the third aperture 83.

As depicted in FIG. 6, in an arrangement the flow modifier 80 may be provided on the first wall 62 downstream of the fourth aperture 84. Alternatively or additionally, a flow modifier 80 may be provided on the second wall 61 downstream of the fourth aperture 84.

The use of such an arrangement may enable a greater local pressure difference at the fourth aperture 84 between the local pressure in the coolant channel 63 and the external pressure in the region 86 around the fourth coolant channel 84 than would be possible for a given nominal coolant pressure within the coolant channel 63. It may therefore be possible to maintain a required flow of coolant through the fourth aperture 84 that is relatively close to the leading edge 51 of the aerofoil blade or vane 50 without requiring excessive coolant flow through the third aperture 83, which is located closer to the trailing edge 52 of the aerofoil blade or vane 50 and therefore has lower external pressure in the region 85 around the third aperture 83 during operation of the gas turbine engine.

As with the arrangement discussed above with reference to FIG. 5, the arrangement depicted in FIG. 6 and discussed above may be used in an arrangement in which the third aperture 83 is one of a third row of apertures 83 and the fourth aperture 84 is one of a fourth row of apertures 84 provided upstream of the third row of apertures 83.

Figure 7:
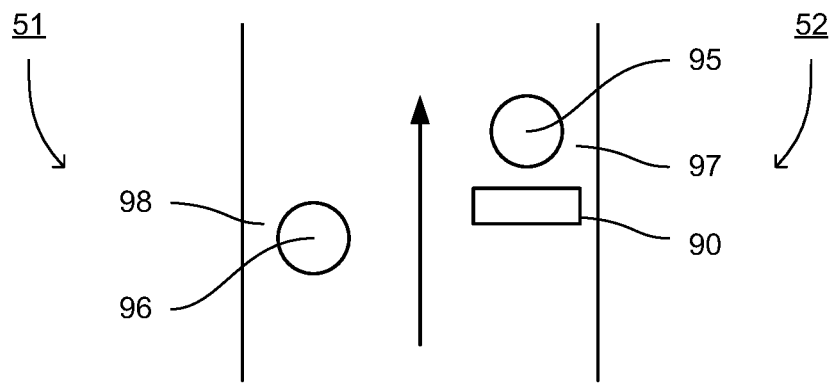
FIG. 7 schematically depicts, in plan view, a coolant channel of a third arrangement according to the present disclosure.

FIG. 7 schematically depicts in plan view an arrangement that may be used for a coolant channel 63 oriented in a radial direction, in a direction from the root to the tip of the aerofoil, for example orthogonal to a direction extending from the leading edge 51 to the trailing edge 52 of an aerofoil blade or vane 50.

As shown, fifth and sixth apertures 95, 96 may be provided between the coolant channel 63 and the external surface of the suction side 53. The fifth and sixth apertures 95, 96 are separated in a direction transverse to the direction of flow of the coolant 65. In the arrangement shown, the fifth aperture 95 may be closer to the trailing edge 52 of the aerofoil blade or vane than the sixth aperture 96.

A flow modifier 90 is provided adjacent the fifth aperture 95 in a configuration corresponding to that depicted in FIG. 5. In other words, the flow modifier 90 may be provided on the first wall 62, adjacent, at upstream of, the fifth aperture 95. In a manner corresponding to that discussed above in relation to FIG. 5, the flow modifier 90 may be configured to reduce the pressure in the coolant channel 63 in the region adjacent the fifth aperture 95. As a result, the pressure in the coolant channel 63 adjacent the fifth aperture 95 may be lower than the pressure adjacent the sixth aperture 96.

Alternatively or additionally, in an arrangement, a flow modifier may be provided adjacent the sixth aperture 96 in a configuration corresponding to that depicted in FIG. 6. Such a flow modifier may be provided downstream of the sixth aperture 96 on either or both of the first wall 62 and the second wall 61. This may increase the pressure in the coolant channel 63 adjacent the sixth aperture 96 relative to the pressure adjacent the fifth aperture 95.

In an arrangement, the flow modifier may be configured such that this pressure difference may compensate for the higher external pressure in the region around the fifth aperture 95 than the external pressure in the region around the sixth aperture 96 during operation of the gas turbine engine. In turn, as discussed above, this may enable the flow of coolant through the fifth and sixth apertures 95, 96 to be set independently, regardless of any differences in external pressure.

As with the arrangements discussed above in respect of FIGS. 5 and 6, the arrangement depicted in FIG. 7 may be used with rows of apertures. For example, the fifth and sixth apertures 95, 96 may be one of a fifth row and a sixth row of apertures 95, 96 that extend in the direction of flow of coolant 65. In such an arrangement, the fifth row of apertures 95 may be closer to the trailing edge of the aerofoil blade or vane 50 than the sixth row of apertures 96.

In all of the arrangements discussed above, the flow modifiers 70, 80, 90 may in general be a feature of the coolant channel 63 that locally reduces the cross-sectional area of the coolant channel. In arrangements, a flow modifier may have a cross-section, transverse to the direction of flow of the coolant, that is one of a square, a rectangle, a triangle and aerodynamically profiled.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A component for a gas turbine engine, comprising:
a first wall defining an exterior surface of the component;
a second wall, arranged such that a coolant channel is defined by a space between the first and second walls; and
a plurality of apertures provided through the first wall to connect the coolant channel to the exterior surface of the component;
wherein:
adjacent at least one aperture of the plurality of apertures, the coolant channel comprises a flow modifier configured to locally change a second pressure of coolant flowing in the coolant channel in a second channel region of the at least one aperture such that the second pressure is different than a first pressure in a first channel region of the coolant channel adjacent at least one other aperture of the plurality of apertures;
the at least one aperture includes a second aperture and the at least one other aperture includes a first aperture;
the first aperture is arranged downstream from the second aperture in a direction of flow of the coolant;
the flow modifier is provided within the coolant channel on a surface of the first wall, upstream of, and adjacent, the second aperture such that a pressure of coolant flowing in the coolant channel in the second channel region of the second aperture is lower than a pressure of coolant flowing in the coolant channel in the first channel region of the first aperture;
said first aperture is one of a first row of apertures and said second aperture is one of a second row of apertures, the first row of apertures arranged downstream from the second row of apertures in the direction of flow of coolant;

the flow modifier is provided within the coolant channel on the surface of the first wall upstream of, and adjacent, each of the apertures in the second row of apertures;

the component is an aerofoil blade or vane, comprising an aerofoil leading edge, an aerofoil trailing edge and an aerofoil suction side;

the first wall defines at least part of the exterior surface of the suction side of the component; and the first aperture and/or first row of apertures is closer to the aerofoil leading edge than the second aperture and/or second row of apertures, respectively.

2. A component according to claim 1, wherein:
the first and second apertures open on the exterior surface of the component in first and second regions, respectively; and
the component is configured such that in use the pressure on the external surface in the first region is higher than in the second region.

3. A component according to claim 1, wherein the component is configured such that, in the region of the first and second apertures, the direction of flow of coolant is in a direction from the aerofoil trailing edge to the aerofoil leading edge.

4. A component according to claim 1, wherein:
the at least one aperture includes a fourth aperture and the at least one other aperture includes a third aperture;
the third aperture is arranged downstream from the fourth aperture in a direction of flow of the coolant; and
the flow modifier is provided within the coolant channel, downstream of, and adjacent, the fourth aperture such that the pressure of coolant flowing in the coolant channel in the second channel region of the fourth aperture is higher than the pressure of the coolant in the coolant flowing channel in the first channel region of the third aperture.

5. A component according to claim 4, wherein:
said third aperture is one of a third row of apertures and said fourth aperture is one of a fourth row of apertures, the third row of apertures arranged downstream from the fourth row of apertures in the direction of flow of coolant; and
the flow modifier is provided within the coolant channel downstream of, and adjacent, each of the apertures in the fourth row of apertures.

6. A component according to claim 5, wherein:
the component is an aerofoil blade or vane, comprising an aerofoil leading edge, an aerofoil trailing edge, and an aerofoil suction side;
the first wall defines at least part of the exterior surface of the suction side of the component; and
the fourth aperture and/or fourth row of apertures is closer to the aerofoil leading edge than the third aperture and/or third row of apertures, respectively.

7. A component according to claim 6, wherein the component is configured such that, in the region of the third and fourth apertures, the direction of flow of coolant is in a direction from the aerofoil leading edge to the aerofoil trailing edge.

8. A component according to claim 4, wherein the third and fourth apertures open on the exterior surface of the component in third and fourth regions, respectively;
wherein the component is configured such that in use a pressure on the external surface in the fourth region is higher than in the third region.

9. A component according to claim 1, wherein:
the at least one aperture includes a sixth aperture and the at least one other aperture includes a fifth aperture;
the fifth aperture is separated from the sixth aperture in a direction transverse to the direction of the flow of coolant; and
the flow modifier is provided within the coolant channel such that the pressure of the coolant flowing in the coolant channel in the second channel region of the fifth aperture is lower than the pressure of the coolant in the coolant channel in the first channel region of the sixth aperture.

10. A component according to claim 9, wherein the flow modifier is provided on the surface of the first wall upstream of, and adjacent, the fifth aperture.

11. A component according to claim 9, wherein the flow modifier is provided downstream of, and adjacent, the sixth aperture.

12. A component according to claim 9, wherein:
said fifth aperture is one of a fifth row of apertures and said sixth aperture is one of a sixth row of apertures, the fifth row of apertures separated from the six row of apertures in a direction transverse to the direction of flow of the coolant; and
a row of flow modifiers is provided within the coolant channel, each row of flow modifiers adjacent a respective aperture in the fifth row of apertures and/or the sixth row of apertures.

13. A component according to claim 12, wherein the component is an aerofoil blade or vane, comprising an aerofoil leading edge, an aerofoil trailing edge and an aerofoil suction side;
the first wall defines at least part of the exterior surface of the suction side of the component; and
the sixth aperture and/or sixth row of apertures is closer to the aerofoil leading edge than the fifth aperture and/or fifth row of apertures, respectively.

14. A component according to claim 9, wherein the fifth and sixth apertures open on the exterior surface of the component in fifth and sixth regions, respectively;
wherein the component is configured such that in use the pressure on the external surface in the sixth region is higher than in the fifth region.

15. A component according to claim 1, wherein the flow modifier has a cross-section in a direction transverse to the local direction of flow of the coolant that is one of a square, a rectangle, a triangle and aerodynamically profiled.

16. A gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft; and at least one component according to claim 1.

17. The gas turbine engine according to claim 16, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

* * * * *